March 28, 1967 H. F. RAYFIELD 3,311,313

TAPE REWIND SYSTEM

Filed July 22, 1963 2 Sheets-Sheet 1

INVENTOR.
HARRY F. RAYFIELD
BY
Christie, Parker & Hale
ATTORNEYS.

March 28, 1967 H. F. RAYFIELD 3,311,313

TAPE REWIND SYSTEM

Filed July 22, 1963 2 Sheets-Sheet 2

INVENTOR.
HARRY F. RAYFIELD
BY
Christie, Parker & Hale
ATTORNEYS.

United States Patent Office 3,311,313
Patented Mar. 28, 1967

3,311,313
TAPE REWIND SYSTEM
Harry F. Rayfield, Arcadia, Calif., assignor to Burroughs Corporation, Detroit, Mich., a corporation of Michigan
Filed July 22, 1963, Ser. No. 296,848
6 Claims. (Cl. 242—55.12)

The present invention relates to tape transports and, more particularly, to an improved tape rewind system for use in high speed tape transports.

In high speed tape transports, such as those employed in electronic computer systems, magnetic recording tape is rapidly drawn from a tape supply reel by a capstan drive assembly and passed through an operational zone to a take-up reel. Coded information is either recorded or read from the tape within the operational zone. In order to allow rapid acceleration and deceleration of the tape as it passes through the operational zone, it is common practice for high speed tape transports to include a motor drive system for each tape reel. The motor drive systems control the angular velocity of the tape reels as tape is fed therebetween and aid in bringing the tape reels up to a maximum speed and in stoppng the tape reels when the capstan drive assembly is de-energized.

In addition to the above, it is common for high speed tape transports to include a tape rewind system for rapidly rewinding tape from the take-up reel to the supply reel when the processing of information on a tape is complete. Various systems have been devised for this purpose. A system commonly employed to rewind tape in high speed tape transports utilizes a motor drive coupled to the supply reel to pull tape from the take-up reel directly to the supply reel, the tape itself supplying the torque needed to turn the take-up reel. Such a system has the distinct disadvantage of requiring an appreciable time to accelerate and decelerate the tape during rewind since the tape is likely to break if accelerated or decelerated too rapidly.

Other rewind systems simply utilize the existing tape transport apparatus and drive the tape by the capstan drive assembly while utilizing the motor drive systems to control the angular velocity of the tape reels during rewind. In such systems, the average tape speed during rewind is relatively slow unless the drive speed of the capstan drive assembly is substantially increased. Such an increase in the drive requirements of the capstan drive, however, materially increases the wear of the bearing supports for the rotating roller of the capstan causing a rapid wear-out of the capstan drive assembly.

The present invention overcomes the above as well as additional problems associated with the prior art tape rewind systems while providing a system for rewinding tape at an extremely high average speed.

Briefly, to accomplish this, the basic form of the tape rewind system of the present invention utilizes the signal controlled motor drive systems of the tape transport to control the angular velocity of the take-up and the supply reel during rewind. To provide the desired control of the motor drive systems the rewind system includes means for generating a first control signal indicative of an accumulated velocity difference between tape fed from the take-up reel and tape supplied to the supply reel and means for generating a second control signal. The first control signal is applied to the motor drive system coupled to the take-up reel to control the angular velocity of the take-up reel and hence the speed with which tape is fed from the take-up reel during rewind. The second control signal is applied to the motor drive system coupled to the supply reel to control the angular velocity of the supply reel and hence the rate at which tape is taken up by the supply reel during rewind. Coupled to the motor drive system for the take-up reel is an angular velocity sensitive means or equivalent means, for controlling the value of a second control signal to decrease the speed of the supply reel from a maximum value when the angular velocity of the take-up reel exceeds a predetermined value.

In operation, with the take-up reel full of tape at the start of rewind, the maximum value of the second control signal is applied to the motor drive system for the supply reel to cause the supply reel to rotate at a maximum angular velocity. The take-up reel speed is regulated under the control of the first control signal applied to the motor drive system for the take-up reel. As the tape is rapidly transferred to the supply reel, the tape speed increases until half of the tape is on each reel. At this time, both motor drive systems are operating substantially at maximum speed and the velocity sensitive means begins to operate to decrease the second control signal from its maximum value. Under the control of the velocity sensitive device, the average value of the second control signal gradually decreases to gradually reduce the angular velocity of the supply reel while the angular velocity of the take-up reel remains about its maximum value until the tape is completely rewound onto the supply reel.

Thus, in the tape rewind system of the present invention one of the motor drive systems is at all times operating at or about a maximum speed to rotate the associated tape reel at its maximum angular velocity. In this manner, the average tape speed during rewind is substantially higher than the average tape speed of prior art rewind systems. Furthermore, since the tape speed is continuously under the control of the motor drive systems, a predetermined safe tape tension is maintained during rewind which prevents tape breakage.

The above, as well as other features of the present invention may be more clearly understood by reference to the following detailed description when considered with the drawings, in which.

Although the present invention is equally useful in tape transports providing a continuous control over the angular velocity of the tape reels (see, for example, the U.S. patent to P. R. Gilson, 2,952,415, issued Sept. 13, 1960) and in tape transports providing periodic or on/off control over the angular velocity of the tape reels (see, for example, the co-pending patent application, Ser. No. 213,-286, filed July 30, 1962, now Patent No. 3,023,635), the tape rewind system will be described in detail with reference to the latter type of tape transport with particular reference being made to the aforementioned co-pending patent application.

Figure 1:
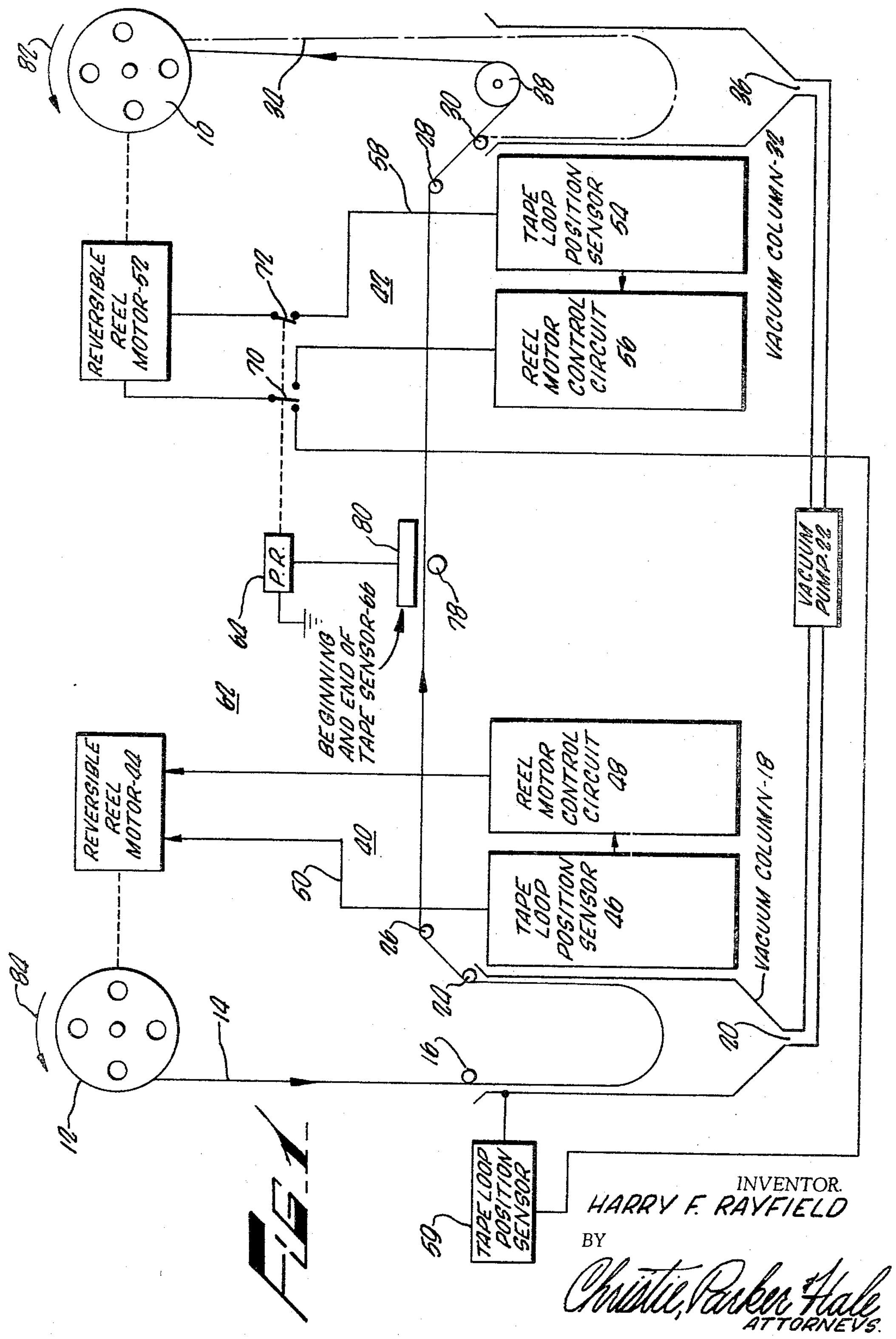
FIGURE 1 is a schematic-block diagram representation of a tape transport including the rewind system of the present invention.

The apparatus illustrated in FIGURE 1 includes only the components of a tape transport necessary to the complete tape rewind system of the present invention. As illustrated, the tape transport includes a rotatably mounted supply reel 10 and a take-up reel 12. A magnetic tape 14 extends between and around the supply reel 10 and the take-up reel 12. The tape transport is represented as being in a state where the magnetic tape 12 has been already fed from the supply reel and wound around the take-up reel. Thus, the take-up reel 12 is illustrated as being full of tape while the supply reel 10 is substantially empty.

The magnetic tape 14, with the take-up reel 12 full, extends from the take-up reel 12 over a stationary guide member 16 into a vacuum column 18. The vacuum column 18 has a port 20 in its lower surface connected to a vacuum pump 22.

The vacuum pump 22 creates a force on the tape 14 within the vacuum column 18 to tend to cause the tape 14 to form a loop within the vacuum column as illustrated. The vacuum column 18 thus arranged acts as a relatively low inertia storage for tape and functions as a buffer between the means for driving the magnetic tape during rewind and the relatively high inertia take-up reel 12.

The tape 14 passes from the vacuum column 18 over fixed guides 24, 26, 28 and 30 into a vacuum column 32. Prior to the actual initiation of the rewind of the tape 14, the tape follows a path indicated by the broken line 34 into the vacuum column 32 and to the supply reel 10.

The vacuum column 32 is similar to the vacuum column 18 and is shaped to receive the tape 14. The vacuum column 32 has a port 36 in its lower surface coupled to the vacuum pump 22. The vacuum pump 22 creates a force on the tape 14 causing the tape 14 to tend to form a loop as illustrated by the broken line within the vacuum column 32. The vacuum column 32 thus acts as a low inertia storage for tape during the feeding of tape between the supply reel 10 and the take-up reel 12.

As will be described hereinafter relative to the actual operation of the rewind system, the magnetic tape 14 during rewind withdraws from the vacuum column 32 and engages a roller 38.

To control the position of the end of the tape loops within each of the vacuum columns 18 and 32 during the normal processing of the magnetic tape 14 from the supply reel 10 to the take-up reel 12, the tape transport includes servo control systems 40 and 42 associated with the take-up reel 12 and the supply reel 10, respectively.

The servo control system 40 includes a reversible reel motor 44 mechanically coupled to the take-up reel 12. The rotational output of the motor 44 controls the angular velocity of the reel 12 and hence the velocity of the tape 14 as it leaves the take-up reel 12.

The servo control system 40 also includes a tape loop position sensor 46. Basically, the sensor 46 may be any assembly capable of generating a control signal indicative of and/or substantially proportional to the position of the end of the tape loop extending into the vacuum column 18 relative to a predetermined reference position. By way of example only, the tape loop position sensor 46 may be of a form described in detail in the aforementioned co-pending patent application and includes a plurality of lamps and photocells positioned on opposite sides of the vacuum column 18.

In addition to the control signal, which is applied to a reel motor control circuit 48, the tape loop position sensor 46 may also be arranged to generate a signal when the tape loop passes from one side to the other of the predetermined reference position. This signal may be processed by the reel motor control circuit 48 or may be applied directly to the reversible reel motor 44, as represented by the lead 50, to reverse the direction of the rotational output produced by the reel motor 44 as by reversing the direction of unidirectional flow through the armature of the motor. Such a reversible motor arrangement is described in detail in the aforementioned co-pending patent application.

Basically, the reel motor control circuit 48 functions in response to the control signal generated by the tape loop position sensor 46 to control the magnitude of an electrical signal applied to drive the reversible reel motor 44. The control circuit 48 may employ any one of a number of conventional circuit designs. In particular, the control circuit 48 may be similar to the control circuit assembly described in detail in the aforementioned co-pending patent application to cooperate with an on-off type of tape loop position sensing arrangement.

Thus arranged, the servo control system 40 functions to selectively control the position on the end of the tape loop within the vacuum column 18 by selectively controlling the magnitude and direction of the rotational output of the motor 44. In particular, in the servo control system 40 the torque of the motor 44 is controlled to either aid or oppose the direction of movement of the tape 14 leaving the take-up reel 12 during the rewinding operation. Through such selective control over the rotational output of the motor drive, the length of the tape loop within the vacuum column is controlled about a predetermined reference length.

Furthermore, in the servo control system 40, the control signal developed by the position sensor 46 is indicative of the accumulated velocity difference between the tape leaving the take-up reel and the tape supplied to the supply reel during the rewind operation. In particular, any differences in the velocity between the tape leaving the take-up reel and that supplied to the supply reel during rewind is reflected in a change in length of the tape loop within the vacuum column 18. For example, if tape is being fed from the take-up reel 12 at 400 inches per second and being supplied to the supply reel at the rate of 402 inches per second, the length of tape within the vacuum column during a one second time interval will decrease by 2 inches. Since the control signal generated by the position loop sensor is indicative of, and/or substantially proportional to the end position of the tape loop relative to a reference position, the control signal generated is also indicative of a time integral or accumulated velocity difference between the rate at which tape is fed from the take-up reel and supplied to the supply reel.

Similarly, the system 42 includes a reversible reel motor 52 mechanically coupled to the supply reel 10. The rotational output of the motor 52 functions to control the angular velocity of the supply reel 10 and hence the rate at which tape is taken up during rewind.

The servo control system 42 also includes a tape loop position sensor 54 and a reel motor control circuit 56. The tape loop position sensor 54 functions in the same manner as the tape loop position sensor 46 to produce a control signal indicative of and/or substantially proportional to the length of the tape loop within the vacuum column 32. The tape loop position sensor also develops a signal on the output lead 58 for reversing the direction of the rotational output of the reel motor as the end of the tape loop passes from one side to the other of a predetermined reference position.

The reel motor control circuit 56 is similar to the control circuit 48 and functions in response to the control signal generated by the sensor 54 to supply an electrical signal to the reversible reel motor 52 determined by the position of the end of the tape loop within the vacuum column 32 so as to maintain the tape loop about the predetermined reference position.

In addition, the column 18 is provided with tape loop sensor 59 for sensing when the loop approaches the top of the column, the sensor 59 may be an additional light and photocell located near the top of the column 18. When the loop extends below the position of the sensor 59, the sensor puts out a drive signal and when the loop becomes too short, the sensor acts to interrupt the drive signal.

The control switch arrangement 62 is operatively associated with both the output of the sensor 59 and the servo control system 42. Basically, the control switch assembly 62 functions in response to an indication of a predetermined beginning or end of the magnetic tape 14 to selectively control the completion of the closed servo control loop of the system 42. To accomplish this, the control switch assembly 62 may take a number of different forms. By way of example only, the illustrated form of the control switch assembly 62 includes a polarized relay 64 having a winding coupled to ground and to a tape sensor 66. The polarized relay 64 includes a pair of switches 70 and 72. The switch 70 is coupled to the input to the reversible reel motor 52 and, in the normally closed position, to the output of the reel motor control circuit 56, while, in the normally open position, the switch 70 connects to the output of the sensor 59. The switch 72 is also coupled to the reel motor 52 to provide a closed circuit for the signal generated by the position sensor 54 for controlling the direction of the rotational output of the reel motor 52. As is commonly known, a polarized relay possesses two opposing stable states and is responsive to an input signal to switch from one to the other of the stable states. At the termination of the input signal, the polarized relay remains in one of its stable states until another input signal is applied thereto. Thus, in a first stable state the switches 70 and 72 are in the position as illustrated with the drive signal from the sensor 59 being applied to the reel motor 52 and the loop of the servo control system 42 being open.

The control signals for controlling the state of the polarized relay 64 are generated by the tape sensor 66. The tape sensor 66 generates a control signal at a predetermined beginning and end of the tape 14. The tape sensor 66 may take a number of different forms depending upon the method employed to indicate the beginning and end of the tape 14. By way of example only, the method of indicating the beginning and end of the tape in the system illustrated includes a perforation in the tape 14. In such an arrangement the tape sensor 66 includes a light 78 positioned on one side of the tape 14 and a photocell amplifier configuration 80 located on an opposite side of the tape from the lamp 78. As the perforation passes over the lamp, light impinges upon the photocell to produce an electrical signal which is amplified and applied to the polarized relay 64 to switch the polarized relay between its stable states.

The control switch assembly 62 is preferably arranged such that at the end of the tape 14 the electrical signal applied to the polarized relay 64 causes the switches 70 and 72 to assume the position illustrated while at the end of the rewind, the indication of the beginning of the tape causes the polarized relay to switch to a second stable state to complete the closed loop of the servo system 42.

Briefly, considering the overall operation of the tape rewind system of the present invention, upon a sensing of the end of the tape 14, the control switch assembly 62 functions to open the loop of the servo system 42 and to apply a drive signal to the reel motor 52. The motor 52 responds to the drive signal to produce a maximum rotational output. This causes the supply reel 10 to begin to rotate at a maximum angular velocity in a direction indicated by the arrow 82. The magnetic tape 14 is thus drawn out of the vacuum column 32, from its position indicated by the broken line 34, to the position indicated by the solid line about the roller 38. The reel motor 52 continues to produce a maximum rotational output and tape is rapidly wound around the supply reel 10.

As the tape moves toward and around the supply reel 10 the tape is drawn out of the vacuum column 18 to cause the end of the tape loop to move upward within the vacuum column. The servo control system 40 rapidly responds to generate an electrical signal in the control circuit 48 which causes the reel motor 44 to rotate in a direction indicated by the arrow 84. The take-up reel 12 supplies tape to the vacuum column 18 to maintain the end of the tape loop within the vacuum column about a predetermined reference position. Since the take-up reel is full, the reversible reel motor 44 readily produces a rotational output sufficient to maintain a tape speed leaving the take-up reel 12 which equals the rate at which tape is being supplied to the supply reel 10.

As tape is wound around the supply reel 10, the tape speed increases and the angular velocity of the rotational output of the reel motor 44, under the control of the servo control system 40, gradually increases to a maximum value when equal amounts of tape are disposed around the supply reel 10 and the take-up reel 12. During this period of time the angular velocity of the rotational output of the reel motor 52 remains at a maximum value in response to the drive signal supplied from the sensor 59.

Figure 4:
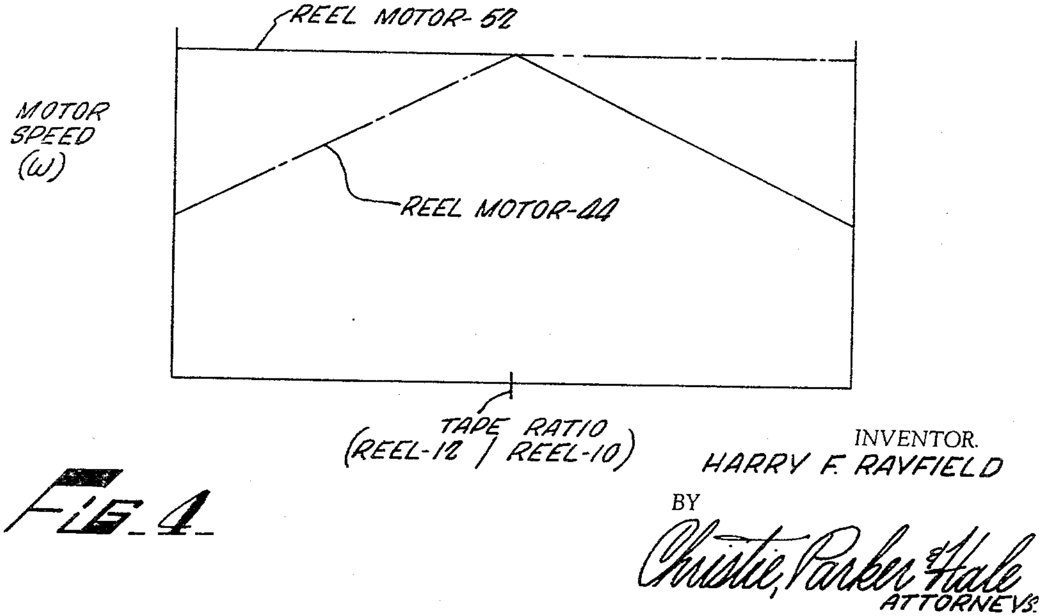
FIGURE 4 is a graphical representation of the motor speeds of the motor drive means associated with the tape rewind system as a function of the ratio of length of tape on the take-up and supply reels.

When equal amounts of tape are wound on the supply and take-up reels, the angular velocity of the rotational output of the reel motor 44 equals the angular velocity of the reel motor 52. As the supply reel 10 continues to receive tape, the angular velocity of the rotational output of the motor 44 is not sufficient to maintain the tape speed high enough to match the increasing tape speed at the supply reel. The loop in the column 18 becomes shorter, operating the sensor 59 to turn off the drive signal to the motor 52. The interruption of the drive signal applied to the motor 52 produces a reduction in the magnitude of the rotational output developed by the motor 52 and hence a slowing of the angular velocity of the supply reel 10. As the angular velocity of the supply reel 10 slows down, the sustained angular velocity of the reel motor 44 causes the loop in the column 18 to increase in length with the result that the drive signal is restored again. The electrical signal applied to the reel motor 52 then returns to its maximum value and the angular velocity of the supply reel 10 begins to increase. As the tape 14 continues to be wound around the supply reel 10, the average angular velocity of the rotational output of the reel motor 52 gradually decreases while the angular velocity of the rotational output developed by the reel motor 44 remains about a maximum value. The above-described operation of the reel motors relative to the amount of tape on the supply and take-up reels is graphically represented in FIGURE 4.

When the tape is completely rewound onto the supply reel 10, the perforation indicating the beginning of the tape passes between the lamp 78 and the photocell arrangement 80 and causes the control switch assembly to switch to its second state disconnecting the reference signal from the tape loop position sensor 59 and again completing the loop of the servo control system 42. When this occurs the tape loop position sensor 54 generates a signal indicative that the tape loop is out of the vacuum column 32. This signal applied to the motor control circuit 56 produces a signal causing the reel motor 52 to reverse its direction, to feed tape into the vacuum column 32. As the tape moves down into the vacuum column the magnitude of the control signal generated by the position sensor decreases and the reel motor 52 comes to a halt with the tape loop in a position indicated by the broken line 34. The tape transport is thus ready for a reprocessing of the magnetic tape 14.

Figure 2:
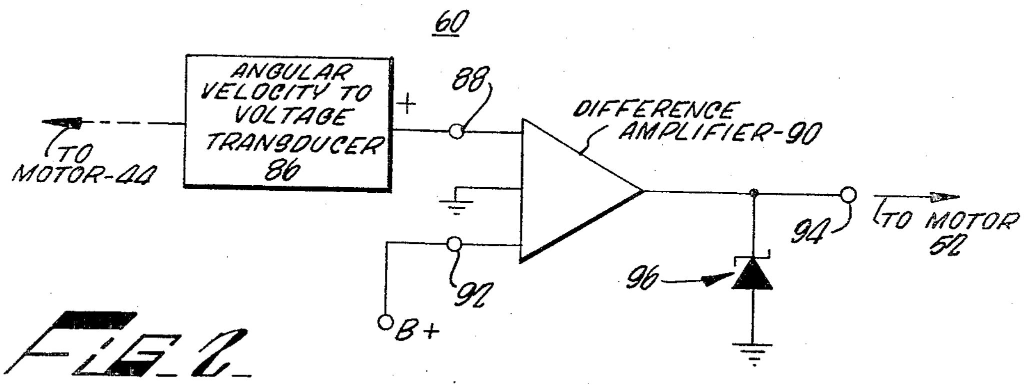
FIGURE 2 is a schematic representation of one form of velocity sensing device for use in the rewind system represented in FIGURE 1.
Figure 3:
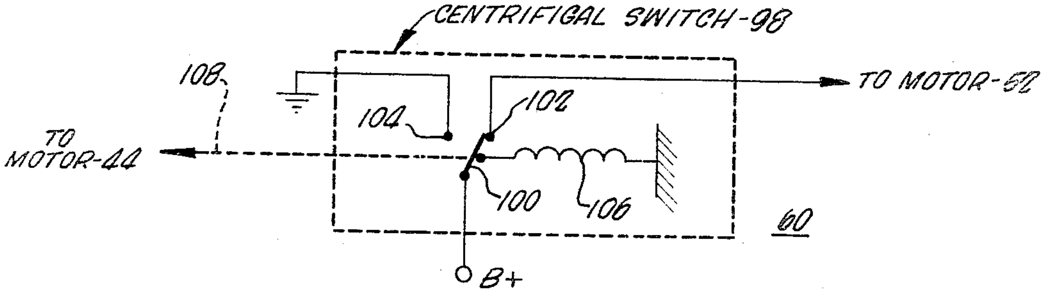
FIGURE 3 is a block diagram representation of another form of velocity sensing device.

Alternative arrangements may be used to control the motor 52 during rewind, as illustrated in FIGURES 2 and 3. In each of these embodiments, the rotational velocity of the reel motor 44 is continuously sensed, making these embodiments particularly desirable where continuous sensing of tape loop length in the vacuum column is employed.

As represented in FIGURE 2, a signal regulator 60 comprises an angular-velocity-to-voltage transducer 86 mechanically coupled to the motor 44 to generate a relative positive output voltage in response to the rotational output of the motor 44. The voltage is directly proportional to the angular velocity of the rotational output of the motor 44. The transducer 86 may take a number of different forms. For example, the transducer 86 my comprise a tachometer arranged to generate an output voltage in response to the rotational output of the motor 44.

The output voltage generated by the transducer 86 is applied to an input terminal 88 of the difference amplifier 90. The reference signal, indicated by the voltage B+, is applied to a second input terminal 92. The difference amplifier 90 is arranged to generate a difference voltage at an output terminal 94 proportional to a difference between input voltage signals applied to the input terminals 88 and 92. The output voltage is applied to the motor 52 through switch 70 in place of the drive signal from the sensor 59 of FIGURE 1.

Coupled to the output terminal 94 of the difference amplifier 90 is a clamping circuit represented by the zener diode 96. The anode of the zener diode 96 is coupled to ground while the cathode is coupled to the output terminal 94. The zener diode 96 possesses a predetermined reverse breakdown voltage and functions to limit the maximum positive voltage which may be developed at the output terminal 94.

The value of the reference voltage B+ is substantially greater than the reverse breakdown voltage of the zener diode. Thus, when the motor 44 is de-energized, the voltage developed at the output terminal 94 is limited at a value determined by the reverse breakdown voltage of the zener diode. As the motor 44 begins to develop a rotational output under the control of the servo control system 40, the voltage signal developed by the transducer 86 increases. The difference voltage developed by the amplifier 90 decreases. However, as long as the difference voltage exceeds the reverse breakdown voltage of the zener diode 96 the voltage developed at the output terminal 94 remains at the value determined by the reverse breakdown voltage of the zener diode.

The transducer 86 is arranged, relative to the value of the reference signal B+, such that the difference voltage developed by the amplifier 90 substantially equals the reverse breakdown voltage of the zener diode 96 when equal amounts of tape are on the supply and take-up reels and the angular velocity of the take-up reel equals the angular velocity of the supply reel. Thus, as tape continues to be fed to the supply reel 10 and the rotational output developed by the motor 44 exceeds the rotational output of the motor 52 the difference voltage falls below the reverse breakdown voltage of the zener diode 96. The voltage developed at the output terminal 94 then follows the actual difference between the reference signal and the voltage signal developed by the transducer 86.

In operation, the reduction in the voltage signal applied to the motor 52 causes the supply reel 10 to slow down and receive tape at a slower rate. As the supply reel slows down, the motor 44, under the control of the servo control system 40, likewise slows down until the angular velocity of its rotational output reaches a value for which the output signal developed by the amplifier 90 again equals the reverse breakdown voltage of the zener diode 96. As this occurs, the rotational output of the motor 52 increases causing the supply reel 10 to again speed up and receive tape at a more rapid rate. The speed-up of the supply reel 10, in turn, produces an increase in the angular velocity of the rotational output of the motor 44, thereby causing the difference voltage to again fall below the reverse breakdown of the zener diode 96.

Thus, as the tape continues to be rewound onto the supply reel 10, the average value of the difference voltage and hence the average value of the angular velocity of the supply reel gradually decreases while the average value of the angular velocity of the reel motor 44 and take-up reel 12 remains about a maximum value determined by the threshold of the regulator 60. In particular, under the control of the velocity sensitive signal regulator 60 illustrated in FIGURE 2, the angular velocity of the motors 44 and 52 follow the curves represented in FIGURE 4 for the average speeds as a function of the tape ratio between the tape on the take-up and supply reels.

Another form of the velocity sensitive signal regulator 60 is illustrated in FIGURE 3. Basically, the regulator includes a centrifugal switch 98 illustrated by a movable switch arm 100 coupled to the source of reference potential B+ for movement between contacts 102 and 104. The movable arm 100 is normally biased to the contact 102 as illustrated by the spring 106. The movable arm is also coupled to respond to the rotational output developed by the motor 44 as indicated by the broken line 108.

In operation the centrifugal switch 98 applies the reference voltage to the motor 52 causing it to rotate at a maximum angular velocity. When, under the control of the servo control system 40, the motor 44 develops an angular velocity substantially equal to the angular velocity developed by the motor 52, a predetermined threshold of angular velocity is reached. At this point a centrifugal force is developed on the movable arm 100 causing it to move from the contact 102 to make contact with the contact 104. This breaks the power connected to the motor 52 causing it to rapidly slow down. As the motor 52 slows down the motor 44, under the control of the servo control system 40, likewise slows down. As the angular velocity developed by the motor 44 decreases below the predetermined threshold value, the centrifugal force developed on the movable arm 100 is insufficient to maintain the arm in contact with the contact 104. The arm then rapidly returns to the contact 102 to again provide a power connection to the motor 52. As the reference voltage is again applied to the motor 52, the angular velocity of the rotational output developed thereby begins to increase toward its maximum value. When this occurs tape is supplied more rapidly to the supply reel 10 causing the angular velocity of the motor 44, under the control of the servo control system 40, to increase above the predetermined threshold value of the centrifugal switch 98. When this occurs the movable arm contacts the grounded contact 104 and breaks the power connection to the motor 52. This process continues until the tape is completely rewound onto the supply reel 10.

Thus, the centrifugal switch 98 provides an on-off power control for the motor 52 in response to the rotational output developed by the motor 44. In particular, the centrifugal switch 98 controls the speed of the motors 44 and 52 such that they follow substantially the curve illustrated in FIGURE 4.

The overall tape rewind system of the present invention as thus described provides a control over the reel motors 44 and 52 to insure a substantially constant tensioning of the tape 14 during the entire rewind operation, thereby preventing tape breakage or fouling within the tape transport. In addition, due to the control provided by the sensor 59 or the sensitive signal regulator 60, the average angular velocity of the rotational outputs developed by the motors 44 and 52 is maintained at a maximum level to provide an efficient and extremely rapid rewind of the tape from the take-up reel to the supply reel.

What is claimed is:

1. In a tape transport apparatus having first and second tape reels between which tape is driven through an operational zone, first and second vacuum columns for normally forming loops in the tape respectively between the first reel and the operational zone and the second reel and the operational zone, apparatus comprising first servo means for controlling the rotation of the first reel in response to variations in the loop length in relation to a first position in the first vacuum column, second servo means for controlling the rotation of the second reel in response to variations in the loop length in relation to a first position in the second vacuum column, third servo means for controlling rotation of the second reel in response to variations in the loop length in relation to a second position in the first column, rewind control means for selectively disconnecting the second servo and connecting the third servo to drive the second reel during a rewinding operation, the third servo controlling the second reel to wind tape on to the second reel at a maximum speed when the loop in the first column is intermediate said first and second positions and to reduce the speed of the second reel as the loop moves closer to the second position, whereby the tape is withdrawn from the second vacuum column by the second reel during the rewinding operation.

2. Apparatus as defined in claim 1 further including a tape guide member positioned adjacent the open end of the second column for engaging the loop when the tape is withdrawn from the second column by the second reel.

3. In a tape transport in which tape is transported between two reels through an operational zone, the tape transport having first and second vacuum columns on either side of the operational zone and first and second drive means for the two reels, the first drive means including means for controlling the first reel in response to the length of a loop of tape in the first column to keep the loop length substantially constant as the tape moves through the operational zone, the second drive means including means for controlling the second reel in response to the length of a loop of tape in the second column to keep the loop length substantially constant: high speed rewind apparatus comprising means for generating a rewind control signal that decreases in magnitude from a predetermined maximum level when the first reel exceeds a predetermined angular velocity, and rewind control means selectively connecting the rewind control signal to the second drive means during rewind and disconnecting the means for controlling the second reel in response to the length of the loop in the second vacuum column, said rewind control means connecting said control signal to drive the second reel in a direction to pull tape out of the second vacuum column.

4. Apparatus as defined in claim 3 further including a tape guide member positioned adjacent the open end of the second column for engaging the loop when the tape is withdrawn from the second column by the second reel.

5. Apparatus as defined in claim 3 wherein said means for generating the rewind control signal includes means for sensing variations in the position of the loop in the first column.

6. Apparatus as defined in claim 3 wherein said means for generating the rewind control signal includes a tachometer coupled to the first reel.

References Cited by the Examiner

UNITED STATES PATENTS

| | | | |
|---|---|---|---|
| 3,091,408 | 5/1963 | Schoeneman | 242—55.12 |
| 3,172,611 | 3/1965 | Harris | 242—55.12 |
| 3,199,800 | 8/1965 | Reader | 242—55.12 |

FRANK J. COHEN, *Primary Examiner.*

GEORGE F. MAUTZ, *Examiner.*